US012743638B1

(12) United States Patent
Nigon et al.

(10) Patent No.: US 12,743,638 B1
(45) Date of Patent: Sep. 22, 2026

(54) SPATIO-TEMPORAL FEATURE ENGINEERING SYSTEM AND METHOD FOR MACHINE LEARNING IN PRECISION AGRICULTURE

(71) Applicant: Deere & Company, Moline, IL (US)

(72) Inventors: Tyler Nigon, St. Paul, MN (US); Brian Bohman, St. Paul, MN (US)

(73) Assignee: Deere & Company, Moline, IL (US)

( * ) Notice: Subject to any disclaimer, the term of this patent is extended or adjusted under 35 U.S.C. 154(b) by 1127 days.

(21) Appl. No.: 17/808,315

(22) Filed: Jun. 23, 2022

(51) Int. Cl.
*G06N 5/022* (2023.01)
*G06F 16/29* (2019.01)
*G06N 5/04* (2023.01)
*A01B 69/04* (2006.01)

(52) U.S. Cl.
CPC ............. *G06N 5/022* (2013.01); *G06F 16/29* (2019.01); *G06N 5/04* (2013.01); *A01B 69/008* (2013.01)

(58) Field of Classification Search
None
See application file for complete search history.

(56) References Cited

U.S. PATENT DOCUMENTS 9,792,557 B2 * 10/2017 Mathur .................... G06N 7/01
11,263,707 B2 * 3/2022 Perry ................... A01B 79/005
11,468,669 B2 * 10/2022 Casas ..................... G06N 3/126
11,508,092 B2 * 11/2022 Watson ..................... G06T 7/97
2020/0025741 A1 1/2020 Rosen et al.

OTHER PUBLICATIONS

U.S. Appl. No. 16/691,884, filed Nov. 22, 2019, titled "Precision Agriculture Using Active Learning", 21 pages (cited in the background of the specification).
"Summary Statistics", Wikipedia encyclopedia, May 31, 2022, available at https://en.wikipedia.org/wiki/Summary_statistics, 3 pages.

* cited by examiner

*Primary Examiner* — Alan Chen
(74) *Attorney, Agent, or Firm* — Hanley, Flight & Zimmerman, LLC

(57) ABSTRACT

Systems and methods that use geospatial data to train machine learning models to make predictions based on the geospatial data, for example for use in precision agriculture. A database is created that includes agricultural geospatial data acquired from two or more data sources. Using the spatial and temporal extent of response data, a training vector and a training feature matrix are then generated using a data systematic approach to engineer a virtually infinite number of training features derived from the database. A plurality of machine learning models are then trained using the training vector and the training feature matrix, with each one of the trained machine learning models generating a test result. At least one of the trained machine learning models is chosen to create predictions using new data at the spatial and temporal extent of interest. An output is created using the prediction(s) on the new data.

25 Claims, 6 Drawing Sheets

SPATIO-TEMPORAL FEATURE ENGINEERING SYSTEM AND METHOD FOR MACHINE LEARNING IN PRECISION AGRICULTURE

This invention was made with government support under STTR Phase I: A Novel Approach to Manage Nitrogen Fertilizer for Potato Production using Remote Sensing, Award No. 1913435, awarded by the National Science Foundation. The government has certain rights in the invention.

FIELD

This technical disclosure relates to using geospatial data to generate trained machine learning models for use in making predictions based on the geospatial data. In one example implementation, the geospatial data and the resulting predictions relate to agricultural, agronomy, and agronomic applications. However, the techniques described herein can be used in non-agricultural, non-agronomy and non-agronomic applications as well.

BACKGROUND

Precision agriculture seeks to improve farming management through the use of detailed analysis of data acquired from various data sources. A number of different precision agriculture techniques are known. One known example of precision agriculture is described in U.S. 2020/0025741, the entire contents of which are incorporated herein by reference. The use of machine learning in data processing is known where the machine learning algorithms can process an extremely large number of data points. An example of the use of machine learning in precision agriculture is described in U.S. patent application Ser. No. 16/691,884 the entire contents of which are incorporated herein by reference.

SUMMARY

Systems and methods are described that involve the use of geospatial data to generate trained machine learning models to make predictions based on the geospatial data. In one non-limiting example, the systems and methods described herein can be used to make predictions in agricultural, agronomy, and agronomic applications. For sake of convenience, unless explicitly specified otherwise by the Applicant, the term agriculture used herein and in the claims includes agronomy and agronomic, and everything else relating to the science or practice of farming for growing of crops and/or rearing of animals, including soil management, crop production, planting, fertilizing, herbicide and pesticide application, crop health, crop yield, pest detection, and many others, as well as the economics thereof. However, the techniques described herein can be used in non-agricultural applications as well.

In one example described herein, a method of precision agriculture can include creating a database that includes agricultural geospatial data, wherein the agricultural geospatial data is acquired from two or more diverse agricultural geospatial data sources. The method further includes generating a training feature matrix based on at least some of the agricultural geospatial data from the database. Generating the training feature matrix includes performing a spatial and temporal query of data from the database to generate initially queried data using spatial and temporal data from a response table that contains training observations, wherein the response table is based on at least some of the agricultural geospatial data from the database, and optionally one or more of: subsetting the initially queried data to generate subset data; generating a data collection from the initially queried data, from the subset data, or from both the initially queried data and the subset data; and performing a summary statistic on the initially queried data, the subset data, or the data collection.

In another example described herein, a method of precision agriculture includes creating a database that includes agricultural geospatial data, wherein the agricultural geospatial data is acquired, directly or indirectly, from two or more diverse agricultural geospatial data sources. A training vector and a training feature matrix are then generated based on at least some of the agricultural geospatial data from the database. Machine learning models are then trained and tested using data of the training vector and the training feature matrix, where each one of the trained machine learning models generates at least one test result. At least one of the trained and tested machine learning models is then chosen based on the at least one generated test result therefrom. A prediction feature matrix is generated using feature parameters of the chosen at least one trained and tested machine learning model together with spatial and temporal constraints of at least one prediction to be made. An output that is associated with an agricultural field is then generated using the chosen at least one trained machine learning model and the prediction feature matrix. The generated output can then be provided to an entity to make a decision based on the output.

In another example described herein, a precision agriculture system can include a database that contains agricultural geospatial data that is acquired from two or more diverse agricultural geospatial data sources. The system further includes one or more data processing devices in communication with the database that execute programmed instructions to: generate a training vector and a training feature matrix based on at least some of the agricultural geospatial data from the database; train and test a plurality of machine learning models using data of the training vector and the training feature matrix, each one of the trained and tested machine learning models generating at least one test result; and allow manual or automatic choosing of at least one of the trained and tested machine learning models based on the at least one generated test result therefrom.

In another example, described herein, a precision agriculture system can include one or more data processing devices and one or more storage devices comprising instructions, which when executed by the one or more data processing devices, configure the one or more data processing devices to: access a database that stores agricultural geospatial data that has been acquired from two or more diverse agricultural geospatial data sources; generate a training vector and a training feature matrix based on at least some of the agricultural geospatial data from the database; train and test a plurality of machine learning models using data of the training vector and the training feature matrix, each one of the trained and tested machine learning models generating at least one test result; allow manual or automatic choosing of at least one of the trained and tested machine learning models based on the at least one generated test result therefrom; generate a prediction feature matrix using feature parameters of the chosen at least one trained and tested machine learning model together with spatial and temporal constraints of at least one prediction to be made; and generate an output associated with an agricultural field using the chosen at least one trained and tested machine learning model and the prediction feature matrix.

DRAWINGS

FIG. 1 schematically illustrates a precision agriculture system described herein.

DETAILED DESCRIPTION

The following is a detailed description of using geospatial data to train machine learning models to make predictions based on the geospatial data. In one non-limiting example, the systems and methods described herein can be used to make predictions in agricultural, agronomy, and agronomic applications. For sake of convenience, the following description will describe the systems and methods with respect to agriculture-related applications. However, the techniques described herein can be used in non-agricultural applications as well.

Figure 1:
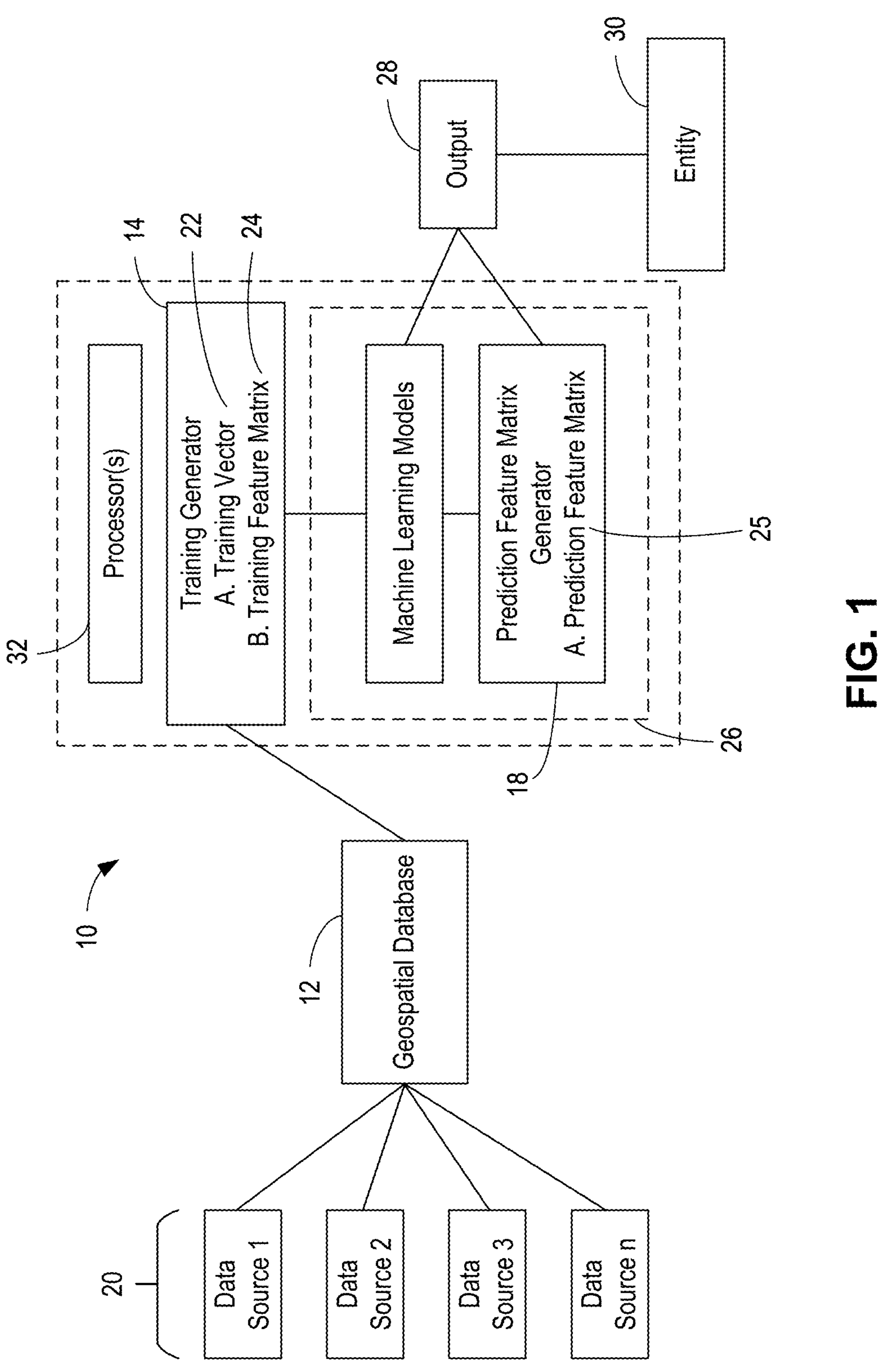

Referring to FIG. 1, an example precision agriculture system 10 is illustrated. The system 10 is depicted as including a database 12 that contains agricultural geospatial data (the database 12 may also be referred to as an agricultural geospatial database), a training generator 14, a plurality of machine learning models 16, and a prediction feature matrix generator 18.

The database 12 can be any type of organized database that contains agricultural-related geospatial data from two or more diverse agricultural geospatial data sources 20. The database 12 can be any arrangement or collection of data. The database 12 can include, but is not limited to, a relational database. In another embodiment, the database 12 can be a flat file database. In one embodiment, the data in the database 12 can be arranged to have 1×n dimensions or n×1 dimensions.

In one embodiment, the data sources 20 may be considered part of and included in the system 10. In another embodiment, the data sources 20 may be considered separate from and not part of the system 10. The data sources 20 are in suitable communication with the database 12 so that geospatial data gathered by the data sources 20 can be transferred into and stored in the database 12. The communication can be wired or wireless, or data from the data sources 20 can be transferred into the database 12 using one or more portable data storage devices such as one or more USB drives.

The data sources 20 can be any data sources suitable for providing geospatial data. The geospatial data may be collected from and relate to a single geographic location, such as a single agricultural field, that is collected over a single season or other single period of time, or collected over multiple seasons or multiple periods of time such as years. In another embodiment, the geospatial data may be collected from and relate to multiple geographic locations, such as multiple agricultural fields, that is collected over a single season or other single period of time, or collected over multiple seasons or multiple periods of time.

For example, one or more of the data sources 20 can include, but are not limited to, one or more weather stations, one or more weather websites, and any other source that provides weather-related data at or near a designated geographic location or locations, such as an agricultural field or agricultural fields.

One or more of the data sources 20 may also be one or more aerial vehicles (manned or unmanned) or one or more satellites that provides imagery data of the geographic location or locations, such as the agricultural field or the agricultural fields. The imagery data can be photographic images (RGB), multispectral images (several spectral bands), hyperspectral images (dozens or hundreds of spectral bands), any derivative image product from these sources (e.g., NDVI, land cover/land use classification, etc.), and any other types of images that are captured by aerial vehicles.

One or more of the data sources 20 may also be one or more farm implements which can be any mechanical implement used in agricultural farming at or near the agricultural field/fields or other designated geographic location(s). A farm implement can include a motorized vehicle such as a tractor, as well as a non-motorized device that is pulled or pushed by a motorized vehicle. Examples of farm implements include, but are not limited to, tractors, combines, harvesters, tillers such as plows, seeders such as planters, cultivators, sprayers, spreaders, balers, spray plane, drones, single disc air seeders, double disc air seeder, shovel air seeders, strip tiller, ridge tiller, chisel plow, deep ripper plows, rolling baskets, rotary hoes, row crop cultivator, rock roller, draper headers, flex headers, straight headers, sunflower headers, edible bean harvesters, corn stripper head, corn knife cutting head, corn mower cutter head, pickup header, swather, multi-weeder, stalk chopper, ditch mower, sickle blade, self-propelled spreader, pull behind spreader, manure spreaders, liquid manure knife cultivators, grain cart, sugar beet cart, sugar beet harvester, sugar beet defoliator, potato harvester, grain storage baggers, straight spike shanks, twist shanks, scrapers, tile plow, cotton picker, irrigation pivots, salford tiller, 20 inch planter, 22 inch planter, 30 inch planters, silage chopper, hay rake, harrow, rototiller, mulch tiller, subsoiler, straight trucks, semi-trucks, hopper bottom trailer, end dump trailer, live bottom trailer, side dump trailer, belly dump trailer, seed tender, rice huller, reaper-binder, sugarcane harvester, carrot harvester, over-the-row mechanical harvester for apples, grape harvester, mechanical tree shaker, bale lifter, bale wrapper, hay tedder, 2wd tractor, 4wd tractor, MFWD tractor, row track, quad track, dual track, all in one sugar beet topper lifter cart. The farm implement can also include a computer, a controller, a monitor/display that is mounted on the farm implement, for example in the cab of a tractor.

One or more of the data sources 20 may also be one or more humans or users that provide geospatial data to the database 12 relating to the agricultural field(s) or other designated geographic location(s). Human or user provided geospatial data can include, but is not limited to, field observations at a particular location and time such as crop health, crop vigor, developmental stage, presence, number, or susceptibility of the crop to pests such as insects, diseases, nematodes, etc.; stand counts; grain counts; tuber counts; weight/biomass measurements; or delineation of field boundaries by the user.

One or more of the data sources 20 may also be data provided by non-weather related sensor(s) at or near the agricultural field(s) or other designated geographic location(s). For example, the sensor(s) can be configured to detect one or more properties of the soil at or near the agricultural field(s) including, but not limited to, moisture content, soil or tissue pH, nutrient content, carbon content, and others. The sensor(s) can be configured to detect one or more tissue properties of plants in the agricultural field(s) including, but not limited to, chlorophyll content, greenness, spectral reflectance, spectral absorption, leaf architecture, and canopy cover.

Specific examples of agricultural geospatial data that can be collected by the data sources 20 and stored in the database 12 can include, but are not limited to, past and/or current imagery of the agricultural field(s); past, current and/or forecasted future weather conditions at or near the agricultural field(s); past, current, and/or predicted soil conditions of the agricultural field(s); past, current, and/or predicted plant tissue conditions from plants growing in the agricultural field(s); as-planted data (for example seed rate, singulations, skips, crop planted, date/time, variety, etc.) of the agricultural field(s); as-applied data of the agricultural field(s) relating to agro-chemical applications including pesticides, herbicides, fertilizers, and the like, product, date/time, rate, equipment information (make, model, serial number, etc.); type of crop(s) grown in past years, crops growing or to be grown in the agricultural field(s); geographic boundaries of the agricultural field(s); stand count; tassel count; soil moisture; soil or tissue pH; soil nutrient content; soil carbon content; soil cation exchange capacity; soil physical properties such as, but not limited to, bulk density, soil color, hydraulic conductivity, structure, color, aggregate stability, etc.; harvest data such as, but not limited to, grain yield, weight, volume, density, foreign matter, moisture; tuber yield, weight, volume, density, moisture, size distribution, biomass; disease prevalence; insect/pest prevalence; data relating to crop progress/stage including, but not limited to, plant emergence, tuber initiation, tuber bulking, tasseling, flowering and others; reflectance data obtained from aerial imagery.

The training generator 14 is in communication with the database 12 and uses at least some of the geospatial data from the database 12 to generate a training vector 22 and a training feature matrix 24 as described in further detail below with respect to FIGS. 3-4. The training vector 22 and the training feature matrix 24 can be stored in suitable storage, such as a training matrix storage database. The general concepts of forming a feature matrix and a training vector are well known to those of ordinary skill in the art of training a machine learning model.

With continued reference to FIG. 1, the trained machine learning models 16 are derived from the training vector 22 and the training feature matrix 24. The trained machine learning models 16 may be derived from conventional machine learning algorithms, with data from the training vector 22 and the training feature matrix 24 being used to train and test the machine learning models 16. A machine learning model generator **16*a* shown in FIG. 5 can be used to train and test the machine learning models 16. The trained machine learning models can be stored in a trained model database (shown in FIG. 5). In machine learning, the feature selection, hyperparameter tuning, training, and testing of the machine learning algorithms are known and performed by the machine learning model generator 16*a*, with the machine learning model generator 16*a*** outputting the trained and tested machine learning models described herein.

In addition, the prediction feature matrix generator 18 generates a prediction feature matrix 25 (or Xp) which can be stored in the trained model database or stored elsewhere. One or more of the trained and tested machine learning models are used to inform the prediction feature matrix generator 18 and help to generate the prediction feature matrix 25. The training generator 14, the model generator **16*a* and the prediction feature matrix generator 18 work together in the following sequence: training generator 14; model generator 16*a*; and prediction feature matrix generator 18. The model generator 16*a* creates the trained models after first deriving the training vector 22 and the training feature matrix 24 by the training generator 14, and the prediction feature matrix generator 18 creates the prediction feature matrix 25** after knowing the location and time of the desired output, as well as the selected features to be used in the trained model.

The machine learning models 16, the model generator **16*a*, and the prediction feature matrix generator 18 may be incorporated together and be part of a common system such as a server 26 or other computer system. In another embodiment, the training generator 14, the trained machine learning models 16, the model generator 16*a*, and the prediction feature matrix generator 18 may be incorporated together and part of the server 26 or other computer system, or incorporated together in a different server or other computer system. In another embodiment, the training generator 14, the trained machine learning models 16/the model generator 16*a*, and the prediction feature matrix generator 18** may be in separate systems such as separate servers.

As depicted in FIG. 1, an output 28 (also referred to as a prediction) is generated using a selected one or more of the trained machine learning models 16 and the prediction feature matrix 25 generated by the prediction feature matrix generator 18. The output 28 can be a prediction associated with one or more agricultural fields at one or more times that may be considered useful in precision agriculture. The agricultural field(s) can be an entire field, a sub-field, a particular location(s) within a field. The output 28 can be predictions for many different times (e.g., hours, days, growth stages, seasons, years, etc.) The agricultural field(s) may be different from the agricultural field(s) from which data has been gathered and included in the database 12 and possibly used to form the training vector 22 and the training feature matrix 24, or the agricultural field(s) may be one of the fields that has provided data included in the database 12 and possibly used to form the training vector 22 and the training feature matrix 24. Examples of the output 28 can include, but are not limited to, a predicted crop yield; a predicted crop moisture during the season or at the time of harvest; a predicted soil moisture or other soil condition at the time of harvest; a tissue prediction; a disease prediction; a pest prediction; a plant count prediction; a crop stage/progress prediction; a tassel count prediction; a weed prediction; potato petiole nitrate prediction; a tissue or grain protein content prediction.

The output 28 can then be presented to an entity 30 or provided in a manner that allows the entity 30 to access the output 28. The entity 30 can be any entity that may have an interest in the resulting output 28. The entity 30 can be an individual or a group of individuals, a corporate entity, a governmental entity, a non-governmental organization, and the like. For example, in one embodiment, the entity 30 can be a farmer or other owner of the agricultural field to which the output 28 applies. The output 28 can be presented to the entity 30 in any form including one or more raw numerical values, one or more summarized data tables that depict the output over space or time, one or more raster images that depict the output, one or more line plots or other graphs that graphically depict the output over time and/or space, combinations thereof and any other form of presentation. In an embodiment, the output 28 is electronically stored and is electronically accessible by a user, and the user can select different forms of electronic presentation of the output 28 on a display device such as a laptop computer, personal computer, a tablet computer, or a mobile device such as a mobile phone. In an embodiment, it may be possible to provide the entity 30 with one of the trained and tested machine learning models without generating the output and providing the output to the entity. The entity 30 can then use the trained machine learning model to generate their own output/prediction.

The output 28 can also be used to generate actions to be taken. For example, the output 28 can be used to generate a notification to scout the field or otherwise provide additional management resources, determine a variable rate prescription for an agricultural field, a seeding/planting prescription for an agricultural field, logistics planning for planting, fertilizer/chemical/manure application, harvesting, scouting, generate a report, calculate aggregated stats (for example, at the organization-, farm-, or field-level), generate trends over time, etc., and other actions in precision agriculture.

The training generator 14, the model generator 16*a*, and the prediction feature matrix generator 18 can be implemented using hardware, software and combinations thereof. One or more data processing devices 32 are in communication with the database 12, the training generator 14, the model generator 16*a*, and the prediction feature matrix generator 18, with the data processing device(s) 32 executing instructions that configure the data processing device(s) 32 to access the database 12, generate the training vector 22 and the training feature matrix 24, train and test the machine learning models 16 using the training vector 22 and the training feature matrix 24, generate the prediction feature matrix 25, and generate the output 28.

Figure 2:
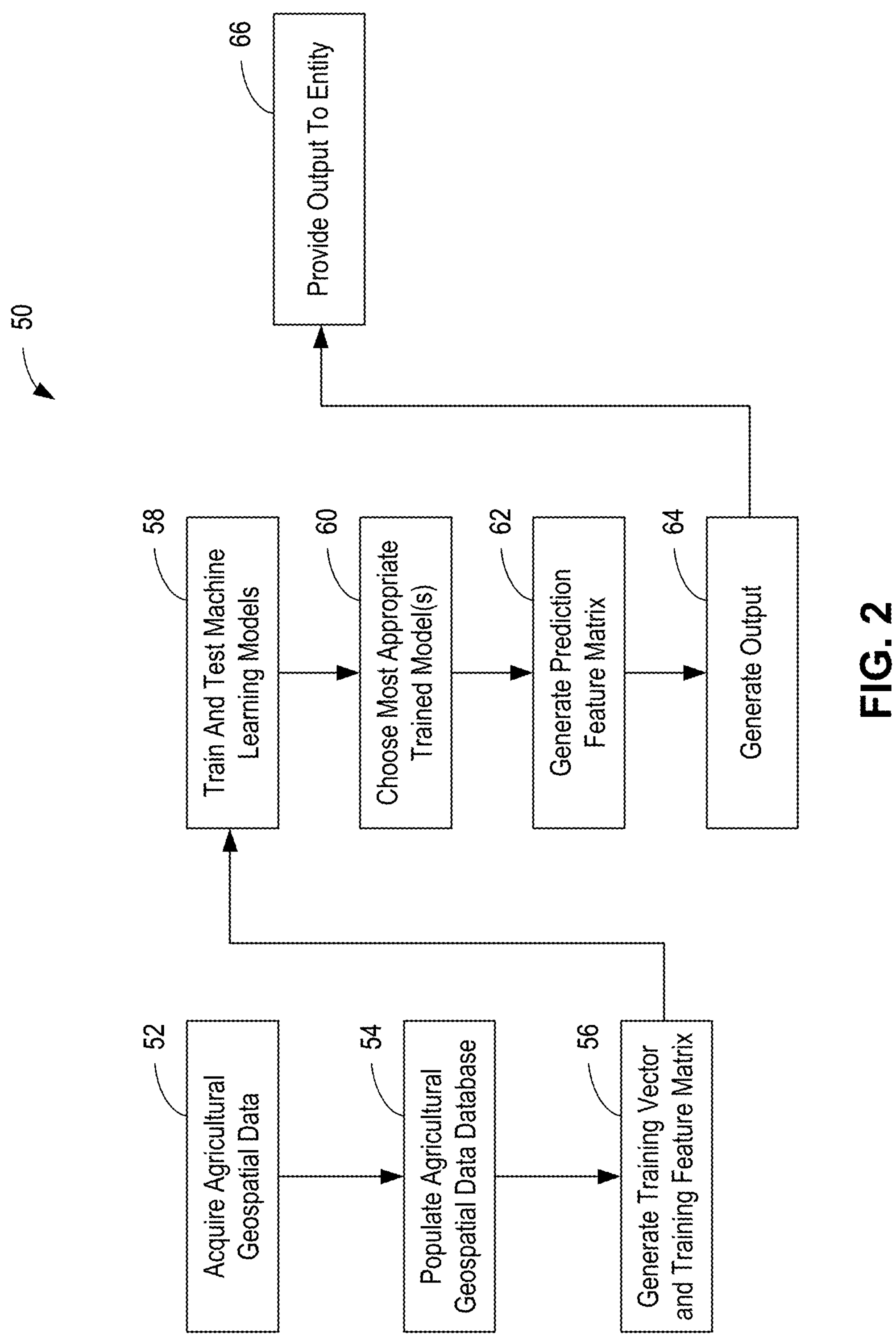
FIG. 2 illustrates steps in an example method of precision agriculture described herein.

Referring to FIG. 2, an example method 50 of precision agriculture using the system 10 of FIG. 1 is illustrated. The method 50 can include some, all or any combination of the steps depicted in FIG. 2. In this example, the method 50 can include acquiring agricultural geospatial data at 52, and populating 54 the database 12 of FIG. 1 with the acquired data. As described above, the geospatial data in the database can be acquired from two or more diverse data sources. Acquiring data as used herein and in the claims means directly acquiring the data from the two or more data sources (which may be referred to as primary data sources), or indirectly acquiring the data for example from a secondary data source that curated the data from the two or more primary data sources.

With continued reference to FIG. 2, at 56, once the database is established, the training vector and the training feature matrix are generated by the training generator based on at least some of the geospatial data from the database. Thereafter, at 58, a plurality of the machine learning models are trained and tested by the model generator using the data of the training vector and the training feature matrix. The trained machine learning models can be stored in the trained model database. Each one of the trained machine learning models generates at least one test result, and at 60 the most appropriate trained machine learning model for the application is chosen, for example manually by a user or automatically by a computer, based on the generated test result therefrom. Factors that can be used to determine which is the most appropriate trained machine learning model to choose include, but are not limited to, model accuracy (potential loss (or gain) in accuracy), model complexity, trait(s), performance, and/or data inventory. With respect to the data inventory of the training vector/training feature matrix and the data inventory of the prediction feature matrix, in an embodiment there can be a trained model whose test results are considered very good. That trained model can be used to make predictions on data from a data inventory because new data for a particular location or time does not exist or is not accessible. For example, there could be a model trained on imagery from a satellite that is no longer in orbit. This is just one example where data inventory of a prediction feature matrix could be used to determine the most appropriate trained model to use.

Once the most appropriate trained machine learning model is selected for making a prediction, the prediction feature matrix is generated at 62. The prediction feature matrix can be generated for particular time(s) and location(s) after the machine learning models are trained and tested and the most appropriate trained machine learning model selected (i.e. after 58 and 60).

At 64, the output is then generated using the chosen trained machine learning model(s) and the prediction feature matrix. The output is then provided to the entity at 66.

When new geospatial data is added to the geospatial database, the steps 56, 58, 60, 62, 64 can be repeated using the new geospatial data in the database. These steps can be repeated automatically whenever sufficient new geospatial data is added, or the repeat of these steps can be manually user initiated. In an embodiment, the steps 56, 58, 60, 62, 64 can be repeated at predetermined time intervals, for example once a day, once a week, once a month, etc., and the time interval can be user selectable or automatically selected, for example based on how often new geospatial data is added to the database. In other embodiments, some or all of the steps 56, 58, 60, 62, 64 can be repeated using different machine learning models and/or using different machine learning model training and testing parameters and/or using different evaluation criteria for choosing at least one of the trained and tested machine learning models.

Figure 3:
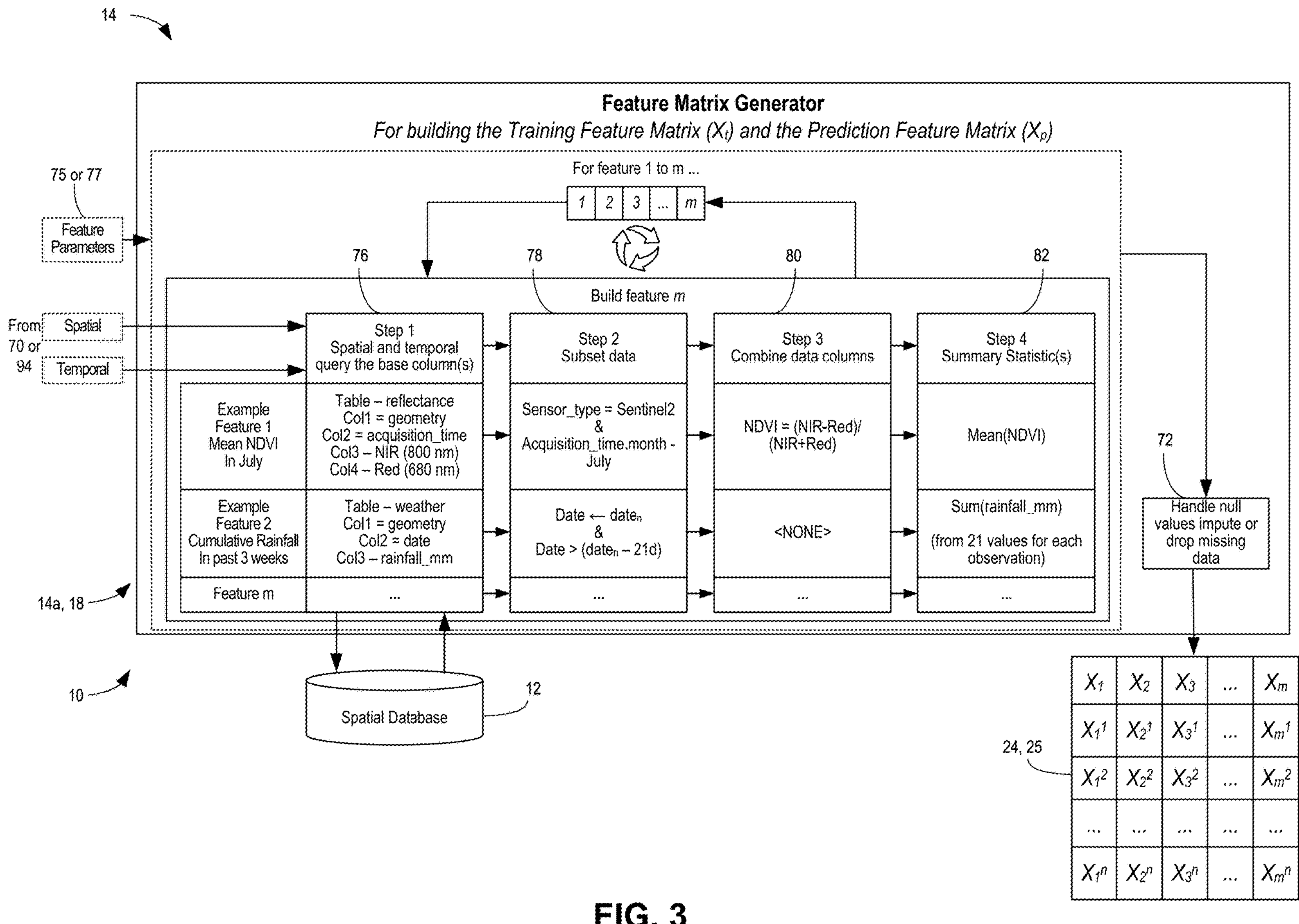
FIG. 3 illustrates a detailed example of a training feature matrix generator of the precision agriculture system described herein.
Figure 4:
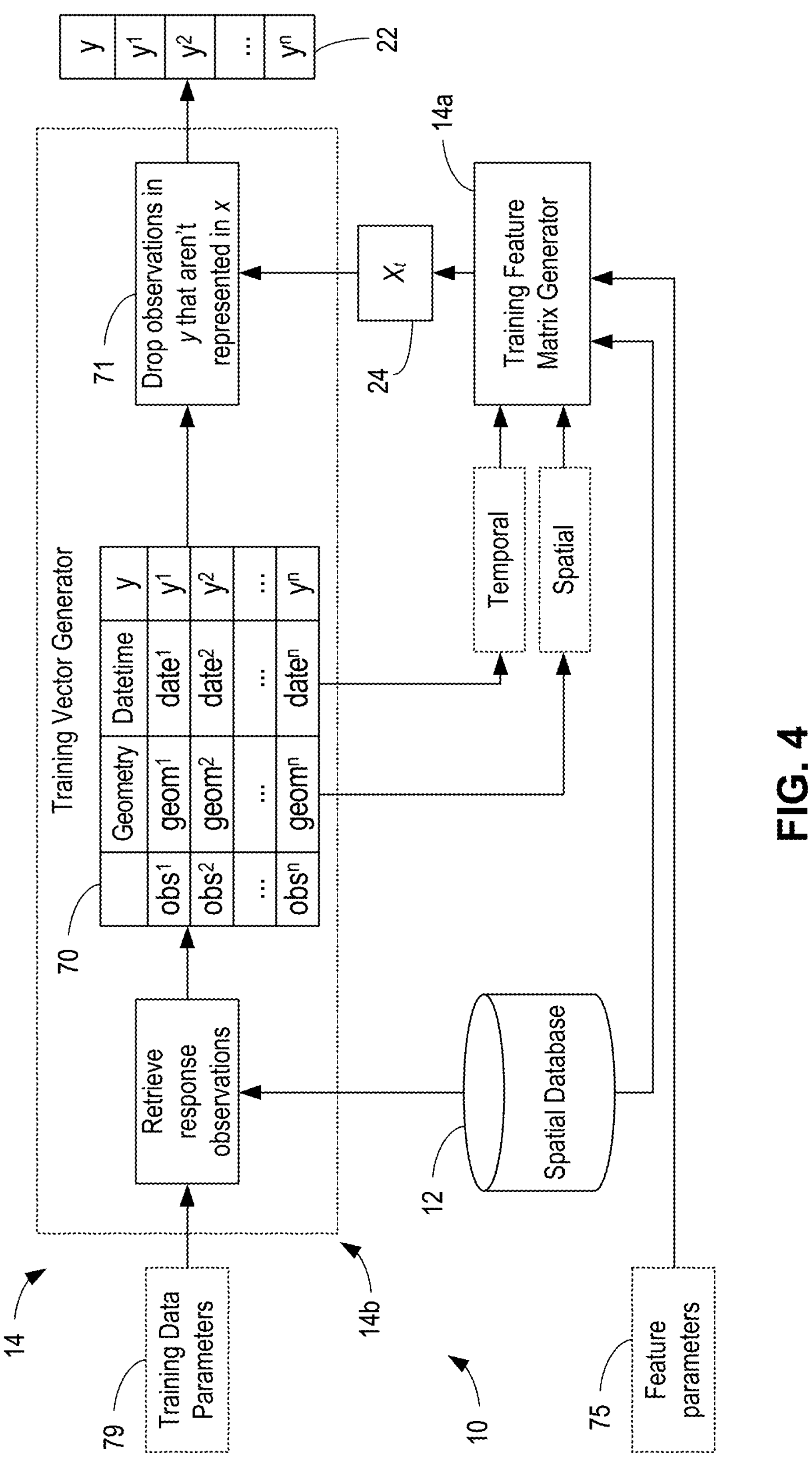
FIG. 4 illustrates a detailed example of a training vector generator of the precision agriculture system described herein.
Figure 5:
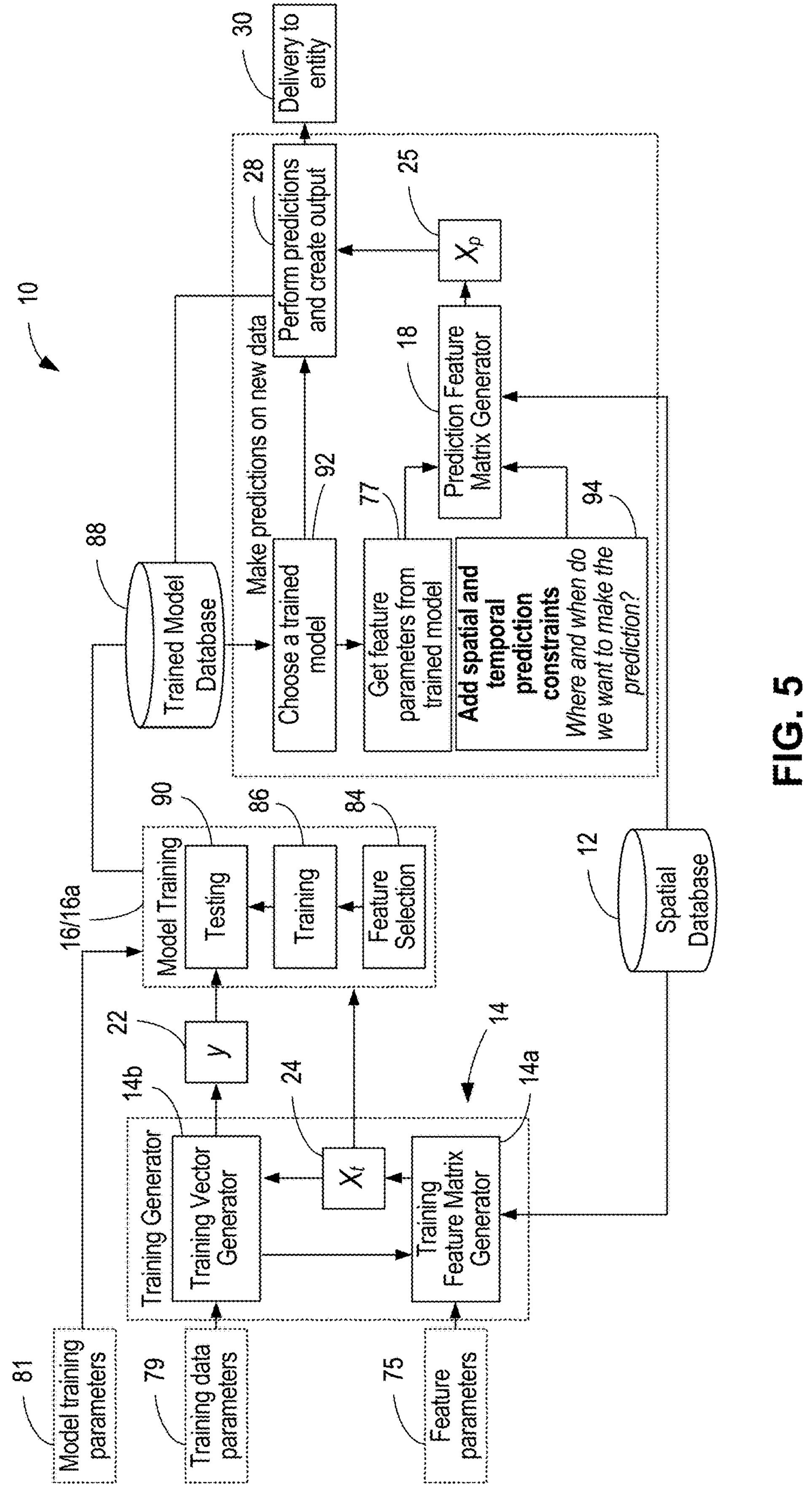
FIG. 5 illustrates a detailed example of using the training feature matrix and the training vector to make predictions in the precision agriculture system described herein.

Referring to FIGS. 3-5, a more detailed example of the precision agriculture system 10 of FIG. 1 and how the system is used is illustrated. Elements in the system 10 in FIGS. 3-5 that are similar to elements in FIG. 1 are referenced using the same reference numerals. In particular, FIG. 3 depicts details of what can be referred to as a feature matrix generator 14*a* (which may be part of the training generator 14) for building the training feature matrix 24 (see FIG. 1), also designated $X_t$. The elements in FIG. 3 also forms the prediction feature matrix generator 18 for building the prediction feature matrix 25 (also designated $X_p$). FIG. 4 depicts details of what can be referred to as a training vector generator 14*b* (which is part of the training generator 14) for building the training vector 22 (see FIG. 1), also designated (y). FIG. 5 depicts details of using the training vector 22 ($y$) and the training feature matrix 24 ($X_t$) to generate the trained machine learning models, and generate a prediction. The process in FIGS. 3-5 is a dynamic process that uses the data from the geospatial database 12. The data in the database 12 includes temporal and spatial attributes, and the process in FIG. 3 is based on the temporal and spatial attributes of the data which are the components used to query and subset the data needed to build the training feature matrix 24. The training of the machine learning models 16 happens after the training feature matrix 24 (Xt) and the training vector 22 described below with respect to FIG. 4 are built. Once the machine learning models are tuned, trained, and tested, and at least one of the training machine learning models is chosen for making one or more predictions on new data, the prediction feature matrix 25 (Xp) is generated by the prediction feature matrix generator 18, for example using the same process depicted in FIG. 3 used to build the training feature matrix 24 (Xt).

In FIGS. 3-4, the process includes gathering geospatial data from the data sources and storing the data in the database 12. The data will have spatial and temporal components (referred to as spatiotemporal data). At least some of the spatiotemporal data in the database 12 is queried to build the training vector (y) 22, then the spatial and temporal data from those observations are used to build the training feature matrix 24. The general concepts of a feature matrix and a training vector are well known in the art of training a machine learning model. To build the training vector (y) 22, a response table 70 is generated containing a plurality of rows of observed data at various points in time and various locations. The observed data can be any observation or measurement about the crop. Observational data that can be used include, but is not limited to, crop yield, crop moisture or quality characteristics, crop nutrition, soil fertility, crop developmental stage, disease severity, etc. The table 70 includes the spatial data (labeled Geometry in FIG. 4) and the temporal data (labeled Datetime in FIG. 4). After the table 70 is generated, any observations that are not represented in the training feature matrix (Xt) 24 are dropped at box 71 when deriving the training vector (y) 22. In an alternative embodiment, it is possible to impute missing records, as indicated at box 72, in the training feature matrix 24 using other adjacent features in the training feature matrix 24 so that the features do not have to be dropped when deriving the training vector 22. For example, referring to the training feature matrix 24, if $X_2^1$ is missing, $X_1^1$, $X_3^1$, and $X_m^1$ can be used to impute a value for the missing $X_2^1$. Because imputation fills in a pseudo value for a missing cell in the training feature matrix 24, there is technically no longer any missing data and that observation does not need to be dropped when building the training vector (y) 22.

To build the training feature matrix (Xt) 24, one or more training features must be chosen for consideration during training of the machine learning models 16. In iterative step 76, data from the response table 70 (FIG. 4) is used to perform a spatial and temporal query, for example of at least one column in the database, to generate initially queried data using spatial and temporal data from the response table 70 that contains training observations. FIG. 3 illustrates two example training features: i) mean NDVI in July; ii) cumulative rainfall in the past 3 weeks. To derive each training feature m, the iterative step 76 is performed for each feature m where at least one table in the spatial database 12 is queried based on the spatial and temporal attributes of each observation in the table 70. For example, in the illustrated "Example feature 1: mean NDVI in July", the "reflectance" table is queried from the spatial database 12 to extract four columns of data: i) the precise geometry of the reflectance data being queried ("Col1"); ii) the precise acquisition time of the reflectance data being queried ("Col2"); the near-infrared (NIR)/800 nm reflectance ("Col3"); and the red/680 nm reflectance ("Col4"). Similarly, for "Example feature 2: cumulative rainfall in the past 3 weeks", the "weather" table is queried from the spatial database 12 to extract three columns of data: i) the precise geometry of the weather data being queried ("Col1"); ii) the precise data of the weather data being queried ("Col2"); and the amount of rainfall ("Col3").

Additional steps 78, 80, 82 are also depicted. The steps 78, 80, 82 can be performed sequentially one after the other as depicted. In another embodiment, the steps 78, 80, 82 may be performed substantially the same time as the step 76, or performed after the step 76 but performed the same time as each other. The steps 78, 80, 82 may act on and modify data that is input into each step, or the steps 78, 80, 82 may simply receive input data but not act on and/or modify the input data, and therefore output the same data that is input. When the steps 78, 80, 82 do not act on and/or modify the input data, the steps 78, 80, 82 may be referred to as being optional. Step 78 may be referred to as subsetting where the initially queried data is subset to generate subset data. Step 80 may be referred to as data collection (or combining data columns) where a data collection is generated from the initially queried data in step 76, from the subset data in step 78, or from both the initially queried data and the subset data. Step 82 may be referred to as a summary statistic step where a summary statistic is performed on the initially queried data from step 76, the subset data in step 78, and/or the data collection from step 82.

In step 78, subsetting of the initially queried data occurs where additional query parameters can be added to more precisely subset the data queried in step 76 (for example, in the case of "Example feature 1: mean NDVI in July", limiting reflectance data that was captured by a particular sensor or sensing platform and was acquired in the month of July).

In step 80, in the case of data arranged in columns, data columns are combined. For example, two or more columns from the initially queried data can be combined to generate one or more combined data columns, two or more columns from the subset data from step 78 can be combined to generate one or more combined data columns, or two or more columns from the initially queried data and the subset data from step 78 can be combined to generate one or more combined data columns (for example, in the case of "Example feature 1: mean NDVI in July", calculating the NVDI value from the NIR and Red reflectance).

In step 82, a summary statistic(s) is performed. In step 82, initially queried data, subset data from step 78, or data from step 80 undergo a summary statistic to ensure that the final intended feature has 1×n or n×1 dimensions. Further information on performing a summary statistic can be found at Wikipedia.org. After step 76 (and steps 78, 80, and 82) is performed for each feature m, any null or missing values are handled by either performing imputation (at box 72; FIG. 3) or by dropping missing observations (at box 71; FIG. 4). After imputation at box 72 (FIG. 3) and dropping missing observations at box 71 (FIG. 4), the training feature matrix 24 has the same number of observations as the training vector (y) 22.

In FIGS. 3-5, feature parameters 75 (in the case of building the training feature matrix 24) define what data is used to generate the training feature matrix 24. Similarly, feature parameters 77 (in the case of building the prediction feature matrix 25) define what data is used to generate the prediction feature matrix 25. The feature parameters 75, 77 may be user defined and/or selected, and/or automatically defined and/or selected. In addition, training data parameters 79 define what data is used to generate the training vector 22. The training data parameters 79 may be user defined and/or selected, and/or automatically defined and/or selected. In addition, model training parameters 81 dictate how steps 84, 86, 90 described below are carried out. The model training parameters 81 may be user defined and/or selected, and/or automatically defined and/or selected.

With reference to FIG. 5, once the training vector 22 and the training feature matrix 24 are generated, the training of the machine learning models 16 can begin. The first step of the model training process is feature selection 84. During feature selection 84, any number of the features available for training in the training feature matrix 24 are selected using common machine learning methods that are well known to those familiar with the art of training and testing machine learning models. A plurality of machine learning models, one for each model training parameter 81, are then trained 86 and tested 90. The results from the model training process (encompassing feature selection step 84, training step 86, and testing step 90) are stored in a trained model database 88. The database 12 and the database 88 may reside together in a single server or separately from one another in separate servers or other locations.

The results from the model training process are then evaluated to choose a trained model 92 to perform predictions and create a new output 28. The trained model can be manually chosen by a user based on their analysis and evaluation of test results from the model training process, or the trained model can be systematically or automatically chosen, for example based on the model accuracy result generated during model testing 90. Model accuracy may be the primary selection criteria, followed by model complexity. For example, in one embodiment, if the test results of one model are better than the test results from a second model, the model with the more accurate test results is chosen. In another embodiment, if relatively similar accuracy between two models is seen, but many less features are used by one of the models, the simpler model (less features/less complexity) can be chosen because the process to build the prediction feature matrix is less complex with less features.

With continued reference to FIG. 5, the prediction feature matrix 25 (Xp) is also generated via the prediction feature matrix generator 18 using the feature matrix generator in FIG. 3. After choosing a trained model and defining the spatial and temporal prediction constraints 94 (i.e., where and when new predictions should be made) and obtaining the feature parameters from the chosen trained model at step 77, the prediction feature matrix 25 can be generated. The prediction feature matrix 25 can be generated using the same iterative four-step process 76, 78, 80, 82 that was used for dynamically building the training feature matrix Xt 24 depicted in FIG. 3.

The output 28 (i.e. a prediction) is then generated using the chosen trained machine learning model(s) and the prediction feature matrix 25.

The output 28 can then be delivered to an entity 30 (also referred to as a customer) in any suitable manner. The output 28 can be electronically delivered, for example transmitted to a remote location, or stored on a portable data storage device and delivered to the entity. Alternatively, the output 28 can be visually delivered to the entity in real-time. The output 28 may also be delivered to multiple entities at the same location or at different locations.

Figure 6:
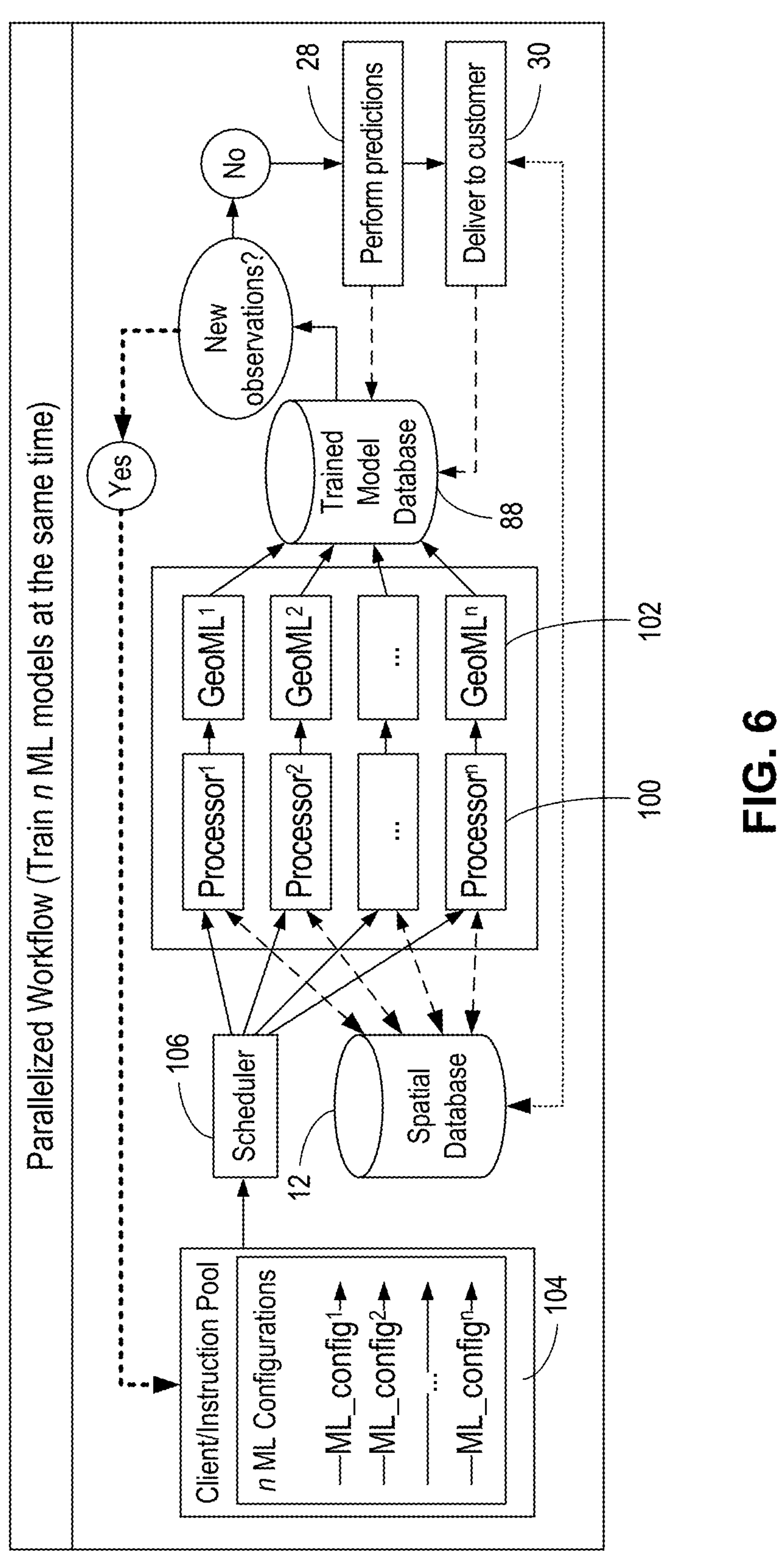
FIG. 6 depicts an iterative process of training machine learning models using geospatial data.

FIG. 6 illustrates an example of a parallel workflow for concurrently training many machine learning models. The model training depicted in FIGS. 3-5 allows for training multiple machine learning models, and the context in which it is able to do so is limited to: features 1 to m considered in the training feature matrix 24; the temporal and spatial constraints for which the data in the table 70 is queried (not shown on FIG. 3); and many other "machine learning parameters" that are set by a configuration file during the model training process and are assumed to remain unchanged in the context of the process outlined in FIGS. 3-5. FIG. 6 illustrates the idea of scalability of the process depicted in FIGS. 3-5. In some applications, the process in FIGS. 3-5 may need to be executed many millions of times (quite possibly billions). For example, in the case of an agricultural application, it may be necessary to train a machine learning model for: thousands of entities, on a daily or weekly basis (dozens or hundreds of times per year), using many combinations/subsets of data (ranging from local to regional to global model training); using a virtually infinite number of features in the training feature matrix 24, with many different cross validation strategies for understanding how overfit/underfit any given machine learning model is expected to behave in a particular environment/scenario, with multiple machine learning algorithms and/or search space for hyperparameter tuning, and with many possible agronomic problems of interest (for example, yield prediction, in-season petiole nitrate, disease, etc.).

In the example in FIG. 6, each data processing device 100 has concurrent access to the spatial database 12. Each instance of "GeoML" 102 (each "GeoML" schematically depicts the process in FIGS. 3-5 up to the model generator **16*a*) and the data processing devices 100 carry out the processes in FIGS. 3-5 including generation of the training vector 22 and the training feature matrix 24, generate the prediction feature matrix 25, as well as training the machine learning models 16, and stores its results in the trained model database 88 (see FIGS. 3-5). The trained models can then be used to perform predictions on new data and generate the outputs. If/when new data observations come into the spatial database for a given set of configurations 104, the whole process can run again automatically. Alternatively, a user can manually select to re-run the process, for example if new data exists or at a scheduled time. The scheduler 106 parses the many configurations 104 to optimize exactly which data processing devices 100 perform which configuration(s) (and in which order). For example, when there are multiple machine learning algorithms to be trained, but all other configuration parameters are identical, it is not efficient to build the training vector 22 and build the training feature matrix 24 for each algorithm, because it is just duplicate work and one would expect to get an identical training vector 22 and training feature matrix 24. Instead, the scheduler 106 can call a single data processing device (but maybe more) to generate the training vector 22 and the training feature matrix 24 and perform feature selection 84 (see FIGS. 3-5). Then the scheduler 106 would send the training data and feature selection results to multiple data processing devices 100 (for example, 5 different data processing devices if there are 5 different machine learning models to train) to carry out training (i.e. hyperparameter tuning) 86 and model testing 90 (see FIG. 5). In an embodiment, there can be a single configuration 104 (instead of multiple configurations 104), and/or a single data processing device 100 (instead of multiple data processing devices), and/or a single "GeoML" 102**.

In one example implementation, the techniques described herein can be used to predict potato petiole nitrate using trained machine learning models. Data inputs for the prediction can include geospatial coordinates of one or more fields of interest, weather (such as rainfall amounts) at or near the field(s), and reflectance data obtained from aerial imagery of the field(s). The potato petiole nitrate may be predicted across every image pixel and for every day of the growing season. The generated predictions may be daily raster images that contain geospatial potato petiole nitrate values for each field and for each day, as well as a line plot illustrating the change in potato petiole nitrate for each field throughout the growing season. Such information can be valuable for potato agronomists when making fertilizer and chemical application decisions (e.g., decisions about how much and when to apply for any location in a field). However, the concepts described herein can be used to make other types of predictions and on other types of crops including, but not limited to, corn, soybeans, wheat, and many others. Other types of predictions include, but are not limited to, predicting above-ground or total biomass, corn sulfur uptake, wheat nitrogen uptake, soil pH, yield, disease, pests, and many others.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of precision agriculture, the method comprising:

creating a database that includes agricultural geospatial data, wherein the agricultural geospatial data is acquired from two or more diverse agricultural geospatial data sources;

generating a training feature matrix based on at least some of the agricultural geospatial data from the database, the database including a response table, the response table based on at least some of the agricultural geospatial data from the database, wherein generating the training feature matrix includes:

imputing a missing record from the response table to form a completed response table, the missing record being an observation in the response table that does not have a corresponding value for a training vector;

performing a spatial and temporal query of data from the database to generate initially queried data using spatial and temporal data from the completed response table; and one or more of the following:

subsetting the initially queried data to generate subset data;

generating a data collection from the initially queried data, from the subset data, or from both the initially queried data and the subset data; or performing a summary statistic on at least one of the initially queried data, the subset data, or the data collection.

2. The method of precision agriculture of claim 1, including generating a training vector using data from the response table.

3. The method of precision agriculture of claim 2, including:

training and testing a plurality of machine learning models using data of the training vector and the training feature matrix, each one of the trained and tested machine learning models generating at least one test result;

choosing at least one of the trained and tested machine learning models based on the at least one test result therefrom;

generating a prediction feature matrix using feature parameters of the chosen at least one trained and tested machine learning model together with spatial and temporal constraints of at least one prediction to be made;

generating an output associated with an agricultural field using the chosen at least one trained machine learning model and the prediction feature matrix; and providing the generated output to an entity.

4. The method of precision agriculture of claim 3, including storing the trained and tested machine learning models in a trained model database.

5. The method of precision agriculture of claim 3, wherein the choosing of the at least one of the trained and tested machine learning models includes manually choosing the at least one trained and tested machine learning model based on the at least one generated test result therefrom, or automatically choosing the at least one trained and tested machine learning model based on the at least one generated test result therefrom.

6. A method of precision agriculture, the method comprising:

maintaining creating a database that includes agricultural geospatial data, wherein the agricultural geospatial data is acquired from two or more diverse agricultural geospatial data sources, the database including a response table, the response table based on at least some of the agricultural geospatial data from the database;

generating a training feature matrix based on at least some of the agricultural geospatial data from the database, wherein the generating of the training feature matrix includes:

imputing a missing record from the response table to form a completed response table, the missing record being an observation in the response table that does not have a corresponding value for a training vector;

performing a spatial and temporal query of data from the database to generate initially queried data using spatial and temporal data from the completed response table;

subsetting the initially queried data to generate subset data;

generating a data collection from the initially queried data, from the subset data, or from both the initially queried data and the subset data; and performing a summary statistic on at least one of the initially queried data, the subset data, or the data collection.

7. The method of precision agriculture of claim 6, including generating a training vector from the response table.

8. The method of precision agriculture of claim 7, including:

training and testing a plurality of machine learning models using data of the training vector and the training feature matrix, each one of the trained and tested machine learning models generating at least one test result;

choosing at least one of the trained and tested machine learning models based on the at least one test result therefrom;

generating a prediction feature matrix using feature parameters of the chosen at least one trained and tested machine learning model together with spatial and temporal constraints of at least one prediction to be made;

generating an output associated with an agricultural field using the chosen at least one trained machine learning model and the prediction feature matrix; and providing the generated output to an entity.

9. The method of precision agriculture of claim 8, including storing the trained and tested machine learning models in a trained model database.

10. The method of precision agriculture of claim 8, wherein the choosing of the at least one of the trained and tested machine learning models includes manually choosing the at least one trained and tested machine learning model based on the at least one generated test result therefrom, or automatically choosing the at least one trained and tested machine learning model based on the at least one generated test result therefrom.

11. The method of precision agriculture of claim 8, including generating a prediction feature matrix using feature parameters of the chosen at least one trained and tested machine learning model together with spatial and temporal constraints of the at least one prediction to be made.

12. A method of precision agriculture, the method comprising:

a) maintaining a database that includes agricultural geospatial data, wherein the agricultural geospatial data is acquired from two or more diverse agricultural geospatial data sources;

b) generating a training vector and a training feature matrix based on at least some of the agricultural geospatial data from the database, the generation of the training vector including imputation of a missing record from the agricultural geospatial data, the missing record being an observation in the agricultural geospatial data that does not have a corresponding value for the training vector;

c) training and testing a plurality of machine learning models using data of the training vector and the training feature matrix, each one of the trained and tested machine learning models generating at least one test result;

d) choosing at least one of the trained and tested machine learning models based on the at least one test result therefrom;

e) generating a prediction feature matrix using feature parameters of the chosen at least one trained and tested machine learning model together with spatial and temporal constraints of at least one prediction to be made;

f) generating an output associated with an agricultural field using the chosen at least one trained machine learning model and the prediction feature matrix; and g) providing the generated output to an entity.

13. The method of claim 12, including storing the trained and tested machine learning models in a trained model database.

14. The method of claim 12, wherein the choosing of the at least one of the trained and tested machine learning models includes manually choosing the at least one trained and tested machine learning model based on the at least one generated test result therefrom, or automatically choosing the at least one trained and tested machine learning model based on the at least one generated test result therefrom.

15. The method of claim 12, including repeating the method using at least one of: new agricultural geospatial data; different machine learning models; different machine learning model training and testing parameters; or different evaluation criteria for choosing at least one of the trained and tested machine learning models.

16. The method of claim 12, including acquiring the agricultural geospatial data.

17. A precision agriculture system, comprising:

a database that contains agricultural geospatial data that is acquired from two or more diverse agricultural geospatial data sources, the database including a response table, the response table based on at least some of the agricultural geospatial data from the database;

one or more data processing devices in communication with the database that, to generate a training feature matrix based on at least some of the agricultural geospatial data from the database, execute programmed instructions to at least:

impute a missing record from the response table to form a completed response table, the missing record being an observation in the response table that does not have a corresponding value for a training vector;

perform a spatial and temporal query of data from the database to generate initially queried data using spatial and temporal data from the completed response table that contains training observations, wherein the response table is based on at least some of the agricultural geospatial data from the database;

generate subset data by subsetting the initially queried data;

generate a data collection from the initially queried data, from the subset data, or from both the initially queried data and the subset data; and perform a summary statistic on the initially queried data, the data subset, and/or the data collection.

18. The precision agriculture system of claim 17, including a trained model database that stores a plurality of trained and tested machine learning models.

19. The precision agriculture system of claim 17, wherein the one or more data processing devices execute additional programmed instructions to generate a prediction feature matrix.

20. A precision agriculture system, the system comprising:

a database that contains agricultural geospatial data that is acquired from two or more diverse agricultural geospatial data sources, the database including a response table, the response table based on at least some of the agricultural geospatial data sources;

one or more data processing devices in communication with the database that execute programmed instructions to:

generate a training vector and a training feature matrix based on at least some of the agricultural geospatial data from the database, the generation of the training vector including imputation of a missing record from the agricultural geospatial data, the missing record being an observation in the agricultural geospatial data that does not have a corresponding value for the training vector;

train and test a plurality of machine learning models using data of the training vector and the training feature matrix, each one of the trained and tested machine learning models generating at least one test result; and allow manual or automatic choosing of at least one of the trained and tested machine learning models based on the at least one test result therefrom.

21. The precision agriculture system of claim 20, including a trained model database that stores the trained and tested machine learning models.

22. The precision agriculture system of claim 20, including the two or more diverse agricultural geospatial data sources from which the agricultural geospatial data is acquired.

23. A precision agriculture system, the system comprising:

one or more data processing devices;

one or more storage devices comprising instructions, which when executed by the one or more data processing devices, configure the one or more data processing devices to:

access a database that stores agricultural geospatial data that has been acquired from two or more diverse agricultural geospatial data sources, the database including a response table, the response table based on at least some of the agricultural geospatial data sources;

generate a training vector and a training feature matrix based on at least some of the agricultural geospatial data from the database, the generation of the training vector including imputation of a missing record from the agricultural geospatial data, the missing record being an observation in the agricultural geospatial data that does not have a corresponding value for the training vector;

train and test a plurality of machine learning models using data of the training vector and the training feature matrix, each one of the trained and tested machine learning models generating at least one test result;

allow manual or automatic choosing of at least one of the trained and tested machine learning models based on the at least one generated test result therefrom;

generate a prediction feature matrix using feature parameters of the chosen at least one trained and tested machine learning model together with spatial and temporal constraints of at least one prediction to be made; and generate an output associated with an agricultural field using the chosen at least one trained and tested machine learning model and the prediction feature matrix.

24. The precision agriculture system of claim 23, including a trained model database that stores the trained and tested machine learning models.

25. The precision agriculture system of claim 23, including the two or more diverse agricultural geospatial data sources from which the agricultural geospatial data is acquired.

* * * * *